(12) United States Patent
Bala et al.

(10) Patent No.: US 10,617,991 B2
(45) Date of Patent: Apr. 14, 2020

(54) LOW DISPERSION GAS-LIQUID SEPARATOR

(71) Applicant: Waters Technologies Corporation, Milford, MA (US)

(72) Inventors: Senthil Bala, Westborough, MA (US); Colin Fredette, Newton, MA (US); Christopher Seith, Franklin, MA (US)

(73) Assignee: WATERS TECHNOLOGIES CORPORATION, Milford, MA (US)

(*) Notice: Subject to any disclaimer, the term of this patent is extended or adjusted under 35 U.S.C. 154(b) by 557 days.

(21) Appl. No.: 15/333,902

(22) Filed: Oct. 25, 2016

(65) Prior Publication Data

US 2017/0113171 A1    Apr. 27, 2017

Related U.S. Application Data

(60) Provisional application No. 62/246,334, filed on Oct. 26, 2015.

(51) Int. Cl.
| | |
|---|---|
| *B01D 45/00* | (2006.01) |
| *B01D 53/02* | (2006.01) |
| *B01D 19/00* | (2006.01) |
| *B01D 15/40* | (2006.01) |
| *B01D 11/00* | (2006.01) |

(52) U.S. Cl.
CPC .......... *B01D 53/025* (2013.01); *B01D 15/40* (2013.01); *B01D 19/00* (2013.01); *B01D 11/00* (2013.01); *B01D 2011/007* (2013.01)

(58) Field of Classification Search
CPC   B01D 53/025; B01D 19/00; B01D 2011/007; B01D 11/00
See application file for complete search history.

(56) References Cited

U.S. PATENT DOCUMENTS

| | | | | |
|---|---|---|---|---|
| 1,548,781 | A * | 8/1925 | Jones ..................... | B01D 19/00 165/84 |
| 3,014,848 | A * | 12/1961 | Ferrari, Jr. ............. | B01D 19/00 435/33 |
| 3,021,871 | A * | 2/1962 | Rodgers .................. | B29C 53/12 138/118 |
| 3,288,169 | A * | 11/1966 | Moss ...................... | A61G 15/16 138/118 |
| 3,791,106 | A * | 2/1974 | Haley ................. | G01N 30/7206 250/288 |
| 3,930,931 | A * | 1/1976 | Baughman ............... | B01D 3/06 159/4.4 |
| 4,116,836 | A * | 9/1978 | DeAngelis ........... | B01D 53/025 210/198.2 |
| 4,407,454 | A * | 10/1983 | Massey ................. | B05B 9/0805 239/154 |

(Continued)

*Primary Examiner* — Dung H Bui
(74) *Attorney, Agent, or Firm* — Womble Bond Dickinson (US) LLP; Deborah M. Vernon; Heath T. Misley

(57) ABSTRACT

The present technology relates to methodologies, systems and apparatus for separating a liquid and a gas from a multi-phase flow stream. In particular, a gas-liquid separator having a curvilinear flow path sized is described. The flow path is designed to create a shift in the axial velocity of the primary flow field through the gas-liquid separator and generate a secondary flow field effect perpendicular to the primary flow field. The curvilinear flow path can minimize additional dispersion and provide improved efficiencies in fraction collection.

21 Claims, 15 Drawing Sheets

(56) References Cited

U.S. PATENT DOCUMENTS

| | | | | |
|---|---|---|---|---|
| 4,612,090 A * | 9/1986 | Ellis, Jr. | ............... | B01D 3/02 |
| | | | | 202/176 |
| 5,004,552 A * | 4/1991 | Al-Yazdi | ............ | B01D 17/0208 |
| | | | | 210/789 |
| 5,441,606 A * | 8/1995 | Schlesinger | ......... | B01D 1/0017 |
| | | | | 202/176 |
| 5,865,995 A * | 2/1999 | Nelson | ................... | B01D 19/00 |
| | | | | 210/205 |
| 7,708,146 B2 * | 5/2010 | Kruyer | ..................... | B03B 5/34 |
| | | | | 209/164 |
| 2004/0016341 A1 * | 1/2004 | Tipler | ................. | B01D 53/025 |
| | | | | 95/82 |
| 2007/0068791 A1 * | 3/2007 | Thom | ..................... | B01D 3/04 |
| | | | | 203/2 |
| 2012/0058568 A1 * | 3/2012 | Sasaki | ................... | G01N 30/32 |
| | | | | 436/161 |
| 2014/0165841 A1 * | 6/2014 | Otsuka | .............. | G01N 30/6095 |
| | | | | 96/101 |
| 2014/0260993 A1 * | 9/2014 | Elms | ................ | B01D 19/0042 |
| | | | | 96/397 |
| 2015/0330953 A1 * | 11/2015 | McCauley | ............. | G01N 30/20 |
| | | | | 73/23.41 |
| 2015/0380278 A1 * | 12/2015 | Landis | .................. | B01D 19/00 |
| | | | | 96/6 |

* cited by examiner

LOW DISPERSION GAS-LIQUID SEPARATOR

RELATED APPLICATION

This application claims the benefit of and priority to U.S. Provisional Application No. 62/246,334, filed Oct. 26, 2015, and titled "Low Dispersion Gas-Liquid Separator," which is owned by the assignee of the instant application and the disclosure of which is hereby incorporated by reference in its entirety.

TECHNICAL FIELD

The present technology relates to a gas-liquid separator for separating a liquid and a gas from a multi-phase flow stream. In particular, the present disclosure relates to methodologies, systems and apparatus for separating a liquid and a gas from a multi-phase flow stream within a gas-liquid separator. The gas-liquid separator can be used, for example, in carbon dioxide based chromatography preparative or analytical systems. In addition, the gas-liquid separator can be used in carbon dioxide based extraction systems.

BACKGROUND OF THE TECHNOLOGY

In general, chromatography involves the flowing of a mobile phase over a stationary phase to effect separation. To speed-up and enhance the efficiency of the separation, pressurized mobile phases were introduced. For example, in carbon dioxide based chromatography systems, carbon dioxide or a carbon dioxide mixture is used as the mobile phase solvent in a supercritical or near supercritical fluid state. To keep the carbon dioxide in a supercritical or near supercritical fluid state the chromatography system is subjected to a predefined pressure. Most often, a back pressure regulator is employed downstream of the chromatography column to maintain the predefined pressure. After the mobile phase mixed with the separated sample passes through the back pressure regulator, the supercritical, near supercritical or liquid carbon dioxide turns into gas phase carbon dioxide. The gas phase carbon dioxide is removed from the liquid eluate by passing through a gas-liquid separator.

Gas-liquid separators are effective at removing gases, but also impose detrimental effects on the detection and any subsequent fraction collection. For example, inertial separators require a comparatively large vessel volume (compared to its liquid volume) into which the aerosolized eluent can expand. This comparatively large vessel can result in cross contamination of fractions. Additionally, these separators typically rely on the formation of liquid droplets that impinge onto the walls/surface of the vessel that ultimately drain to the bottom by flowing along the wall/surface of the vessel. This can result in a significant amount of dispersion and possibly cross contamination of separated samples. Similarly, cyclone separators require the use of an applied centrifugal force which in some applications is variable and frequently inconsistent. For example, there is a sizeable difference between gas and liquid velocities which can lead to the re-entrainment of liquid from the wall. In addition, the dispersion of liquid droplets onto the walls/surface of the vessel that ultimately drain to the bottom of the vessel, can result in cross contamination of fractions. As such, there remains a need for more robust and efficient gas-liquid separators and separation methods to enhance fraction collection yields and purity.

BRIEF SUMMARY OF THE TECHNOLOGY

The present technology relates to separating a multi-phase fluid into its gas and liquid components. In particular, the embodiments of the present technology relate to separating a multi-phase fluid into its gas and liquid components in carbon dioxide based chromatography, i.e., chromatography in which the mobile phase includes carbon dioxide.

The apparatus, systems and methods disclosed herein include a gas-liquid separator having a curvilinear flow path (e.g., coiled tubing or a curved confined flow path). The gas-liquid separator of the present technology can be adapted (e.g., sized, shaped, positioned) to minimize dispersion, which plagues conventional gas-liquid separators. That is, the gas-liquid separator of the present technology can be adapted to minimize the dispersion effects associated with separating a gas-liquid in a vessel. In some embodiments, the gas-liquid separator is not only comprised of a curvilinear path, but also sized, shaped and positioned to provide a shift in the flow velocity of an axial flow field. In particular, due to one or more of the size, shape or position of the curvilinear flow path, a secondary flow field effect acting perpendicular to a primary flow field is produced. In some embodiments, the shift in the flow velocity of an axial flow field in combination with a centrifugal force drives a liquid within the multi-phase flow stream to an inner bend radius of a member defining the curvilinear flow path. That is, liquid coalesces and flows down the inner bend radius of the curvilinear flow path. As a result, better separation of the phases occurs resulting in more efficient collection and increased purity of the separated materials.

In general, the technology of the present invention provides advantages over conventional gas-liquid separators. For example, in some embodiments, the present technology allows for minimization of dispersion effects as compared to conventional gas-liquid separators and techniques. That is, in conventional gas-liquid separators the multi-phase flow stream is delivered to the vessel for separation. The separating components, which collect in the vessel of conventional systems, can create splattering. This splattering creates additional adverse dispersion and cross-contamination. In the gas-liquid separator of the present technology, the confined curvilinear flow path drives separation of the phases creating a "first in-first out" separation. That is, the multi-phase flow stream separates along the curvilinear flow path and is delivered to the vessel at a T-junction, i.e., a substantially right angle, preventing splattering.

In one aspect, the present technology relates to a gas-liquid separator for a multi-phase flow stream, including an enclosed tubing having an inlet adapted to receive a multi-phase flow stream and an outlet connected to a vessel, the enclosed tubing configured in a curvilinear flow path from the inlet to the outlet to create laminar flow conditions within the multi-phase flow stream.

Embodiments of the above aspect can include one or more of the following features. In one embodiment, the curvilinear flow path is confined and extends substantially in a 2-D plane (e.g., a ring). In one embodiment, the curvilinear flow path extends substantially in three dimensions (e.g., a coil). In some embodiments, the multi-phase flow stream includes $CO_2$. In some embodiments, the outlet is connected to the vessel at substantially a right angle. In some embodiments, at least one impact member is disposed within the vessel of the gas-liquid separator.

In another aspect, the present technology relates to a gas-liquid separator for a multi-phase flow stream, including a vessel extending in a first direction having a liquid outlet for discharging a liquid after separation of the liquid from the multi-phase flow stream and a gas outlet for discharging a gas after separation of the gas from the multi-phase flow stream; and an inlet for receiving a multi-phase flow stream, wherein the inlet is fluidly connected to the vessel through a member having a lumen about a central axis, the member comprising a curvilinear flow path that extends a distance over the first direction.

Embodiments of the above aspect can include one or more of the following features. In one embodiment, the curvilinear flow path has a pitch (p) that remains constant over the first direction. In one embodiment, the curvilinear flow path has an inner diameter (d) that remains constant over the first direction. In some embodiments, the pitch (p) of the curvilinear flow path varies along the first direction. In one embodiment, the outer diameter (D) of the curvilinear flow path varies along the first direction. In some embodiments, the outer diameter (D) increases along the first direction. In one embodiment, the curvilinear flow path has a curvature ratio (d/D) adapted to produce laminar flow. In one embodiment, the curvilinear flow path has a curvature ratio (d/D) adapted to minimize turbulent flow. In one embodiment, the curvilinear flow path is adapted to produce a shift in the flow velocity of an axial flow field as a result of a secondary flow field effect acting perpendicular to a primary flow field. In some embodiments, the secondary flow field effect in combination with a centrifugal force drives a liquid within the multi-phase flow stream to an inner bend radius of the member. In one embodiment, the member is formed from an expandable material. In some embodiments, an actuator is adapted to produce a change in the length or outer diameter (D) of the member along the first direction. In some embodiments, at least one impact member disposed within the vessel of the gas-liquid separator.

In a further aspect, the present technology relates to a phase separation system, including a mixing unit for mixing together at least two different fluid sources; a gas-liquid separator, located downstream and in fluid communication with the mixing unit, the gas-liquid separator including a vessel extending in a first direction having a liquid outlet for discharging a liquid after separation of the liquid from a multi-phase flow stream and a gas outlet for discharging a gas after separation of the gas from the multi-phase flow stream; and a vessel inlet for receiving a multi-phase flow stream, wherein the vessel inlet is fluidly connected to the vessel through a member having a lumen about a central axis, the member comprising a curvilinear flow path that extends a distance over the first direction.

Embodiments of the above aspect can include one or more of the following features. In one embodiment, a pressure drop occurs within the mixing unit to generate the multi-phase flow stream. In one embodiment, the curvilinear flow path is adapted to produce a shift in the flow velocity of an axial flow field as a result of a secondary flow field effect acting perpendicular to a primary flow field. In some embodiments, the secondary flow field effect in combination with a centrifugal force drives a liquid within the multi-phase flow stream to an inner bend radius of the member. In some embodiments, a chromatography column is positioned downstream of the mixing unit but upstream of the gas-liquid separator.

In yet another aspect, the present technology relates to a method for separating a multi-phase flow stream into a gas and a liquid within a gas-liquid separator, including providing a gas-liquid separator that includes an inlet and a vessel having a liquid outlet and a gas outlet; introducing the multi-phase flow stream as a primary flow field into the inlet; passing the multi-phase flow stream through a curvilinear flow path to generate a secondary flow field effect acting perpendicular to the primary flow field for separation of the gas from the flow stream; driving a liquid within the multi-phase flow stream to an inner bend radius of the curvilinear flow path; directing the separated gas to the gas outlet; and collecting the liquid by gravity through the liquid outlet.

The present technology provides a number of advantages over current methods, systems and apparatus. For instance, the present technology provides a gas-liquid separator comprising a curvilinear flow path adapted to produce a shift in the flow velocity of an axial flow field as a result of a secondary flow field effect acting perpendicular to a primary flow field to enhance the separation of an amount of liquid and an amount of gas from the multi-phase flow stream (e.g., mobile phase). The present technology minimizes cross contamination of solvents, i.e., results in a well swept gas-liquid separation. It also minimizes additional dispersion that is part of the large volume inertial separators, and improves the liquid/gas recovery. As a result of minimizing additional dispersion within the gas-liquid separator, more efficient collection of the separated materials is achieved.

BRIEF DESCRIPTION OF THE DRAWINGS

The foregoing and other features and advantages provided by the present technology will be more fully understood from the following description of exemplary embodiments when read together w the accompanying drawings.

The skilled artisan will understand that drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features e.g., functionally similar and/or structurally similar elements).

DETAILED DESCRIPTION OF THE TECHNOLOGY

Figure 1:
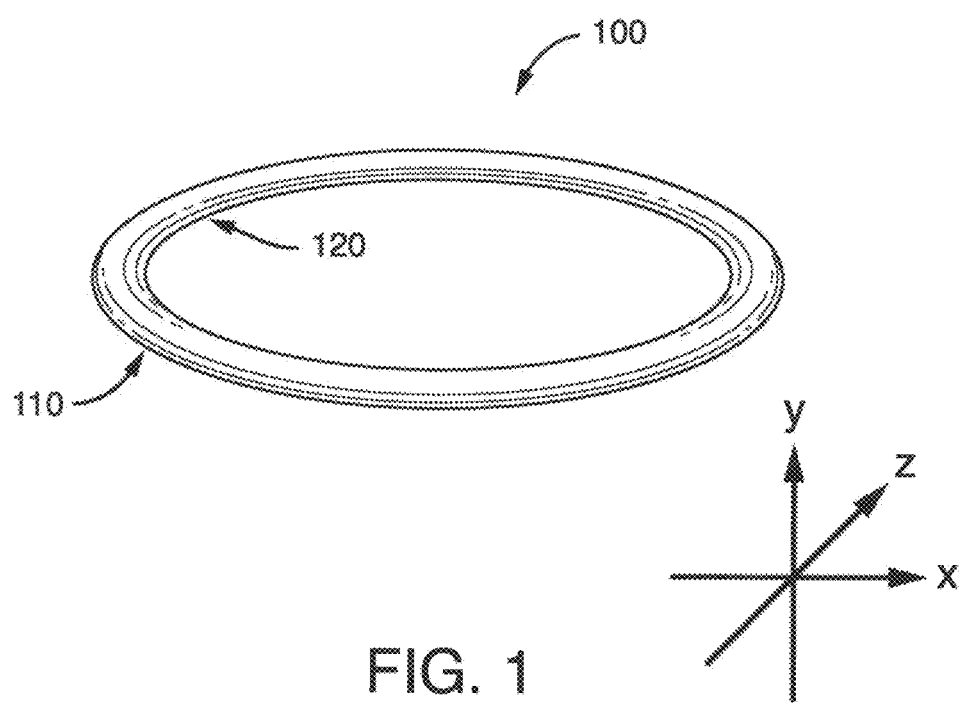
FIG. 1 schematically illustrates an embodiment of a curvilinear flow path.

The present technology relates to a gas-liquid separator for separating a fluid (e.g., methanol) and a gas (e.g., carbon dioxide) from a multi-phase flow stream. Also provided herein, are methodologies and apparatus for separating a multi-phase mixture (e.g., mixed mobile phase) into a gas and a liquid within a gas-liquid separator and a system (e.g., phase separation system).

Gravity settling, inertial separators and filters are a few different conventional technologies used for gas-liquid separation. Gravity settling and inertial separators generally have a large volume container relative to the liquid volume which can result in relatively large unswept regions and lead to cross contamination of fractions. In addition, these larger inertial separators depend on the liquid droplets from the multi-phase flow stream to impinge on the walls/surface of the vessel and drain to the bottom by flowing along the walls/surface of the vessel. This can result in a significant amount of dispersion and splatter. Filters can become easily clogged which can result in large amounts of dispersion.

In general, the present technology provides a better and more efficient phase separation without increasing dispersion effects or introducing opportunities for cross contamination which plagues conventional inertial or cyclone separators. By using a curvilinear flow path to create flow conditions advantageous to the separation phases, a "first-in-first-out" separation can occur. The "first-in-first-out" separation can prevent cross-contamination of solvents and/or splattering/additional dispersion effects from pooling in the vessel.

In one embodiment, the gas-liquid separators of the present technology utilize an enclosed tubing (e.g. a confined flow path) to initiate separation of components within a multi-phase flow stream along a curvilinear flow path. The curvilinear flow path transports the multi-phase flow stream to a collection vessel. The curvilinear flow path creates conditions for laminar flow which aids in the coalescence of fluid along a portion of a wall of the enclosed tubing. In certain embodiments, the curvilinear flow path formed from enclosed tubing is contained substantially in a 2-D plane. For example, a ring of enclosed tubing. In other embodiments, the curvilinear flow path extends beyond the second dimension. That is, the curvilinear flow path extends in three dimensions (e.g. a coil of tubing versus a ring).

In another embodiment, the gas-liquid separators of the present technology utilize a collection vessel connected to a curvilinear flow path. In this embodiment, the curvilinear flow path extends over a length to create a 3-D curvilinear flow path (e.g., a coil or spiral) to initiate separation of components within a multi-phase flow stream. The curvilinear flow path transports the multi-phase flow stream to the collection vessel. The curvilinear flow path creates conditions to produce a secondary flow effect acting perpendicular to a primary flow field which in combination with a centrifugal force aids in the coalescence of fluid along an inner wall of the curvilinear flow path. That is, liquid coalesces and flows down the inner bend radius of the curvilinear flow path.

The present technology provides gas-liquid separators, comprising a curvilinear flow path adapted to produce laminar flow or to reduce turbulent flow to enhance the separation of an amount of liquid and an amount of gas from the multi-phase flow stream (e.g., mobile phase). One of the advantages of the present technology is the minimization of cross contamination of solvents, i.e., results in a well swept gas-liquid separation. It also minimizes dispersion that is part of the large volume inertial separation, and improves the liquid/gas recovery. As a result of minimizing turbulent flow within a curvilinear flow path, a more efficient separation occurs.

As used herein, the term "flux" refers to the rate of flow of a property per unit area. For example, the amount of the multi-phase flow stream that flows through a given cross-section of the curvilinear flow path per second.

As used herein, the term "phase" refers to the thermodynamic state of a mixture (e.g., liquid, gas, supercritical fluid). A flow stream in a system in accordance with the present technology may contain more than one phase, for example the flow stream can include a liquid phase and a gas phase (i.e., a "multi-phase flow stream"). In some embodiments, the multi-phase flow stream or multi-phase fluid stream can have more than about 0.1% liquid (e.g., 0.5%, 1%, 1.5%, 2%, 5%, 10%, 15%, or more.

As used herein, the term "phase separation system" refers to a system having a flow stream (e.g., a multi-phase flow stream) capable of liquid/gas transitions within the system. Phase separation systems can include carbon dioxide based chromatographic systems. In addition, the phase separation systems can include carbon dioxide based extraction systems.

Figure 2A:
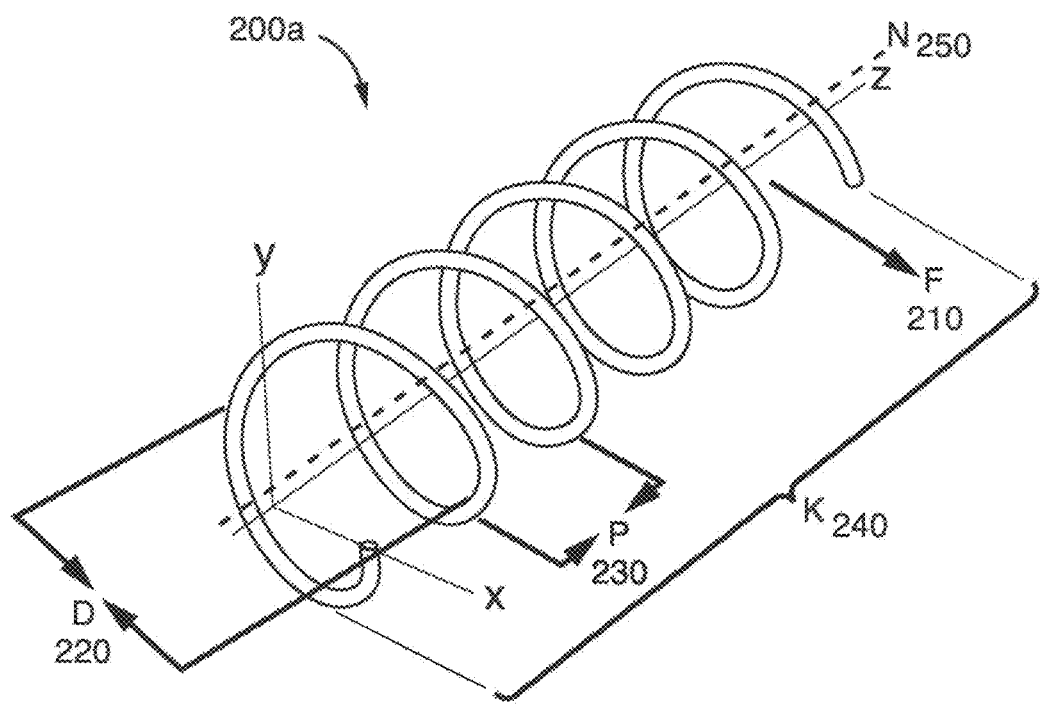
FIG. 2A schematically illustrates another embodiment of a curvilinear flow path.

As used herein, the term "enclosed tubing" or "confined flow path" refers to tubing that is at least partially, preferably entirely, enclosed. As shown in FIG. 1, the enclosed tubing 100 has an outer portion 110 and an inner portion 120 and is configured in a curvilinear flow path that extends substantially in a 2-D plane. (An inlet to the tubing 100 and outlet to a vessel (not shown) may lie outside the 2-D plane.) In other embodiments, the enclosed tubing may be configured in a curvilinear flow path that extends substantially in three dimensions. As shown in FIG. 2A, the curvilinear flow path 200a is substantially coiled in shape and can extend over a distance k 240.

An example enclosed tubing can be made out of any material compatible with chromatography mobile phases, including carbon dioxide based chromatographic separation systems. The enclosed tubing can be made using solvent resistant plastics, non-reactive metals or stainless steel tubing. For example, the flow path can be made using, at least in part, a flexible chemical resistant polymer, such as fluoropolymer tubing (e.g. Tygon® tubing available from Saint Gobain Performance Plastics). The inner diameter of the tubing (i.e. defining the diameter of the flow path) can be selected based upon system preferences.

The enclosed tubing also has an inlet for receiving an multi-phase flow stream as a primary flow field. The inlet can be sized and shaped to efficiently and effectively receive the flow stream. The multi-phase flow stream can include the mobile phase flow, whole or partial, from an analytical or preparative chromatographic or extraction system. In one embodiment, the multi-phase flow stream includes carbon dioxide ($CO_2$). The multi-phase flow stream has a primary flow field which refers to the dominate flow characteristic of the multi-phase flow stream within the curvilinear flow path. In some embodiments, the flow within the curvilinear flow path experiences a centrifugal force. In other embodiments, the centrifugal force leads to the generation of a low velocity region and a high velocity region within the curvilinear flow path. In one embodiment, the flow stream is substantially the entire effluent flow from a preparative carbon dioxide based chromatographic or extraction system.

The enclosed tubing has an outlet connected to a vessel. The outlet can be sized and shaped to efficiently and effectively discharge the respective gas and liquid from the enclosed tubing to the vessel. In one embodiment, the outlet is connected to the vessel at substantially a right angle. In general, the configuration of the outlet can be selected in accordance with the needs of a given system.

The vessel can be any structure capable of separating a gas and a liquid having a multi-phase flow stream inlet. The vessel has an inlet for receiving flow from the curvilinear flow path and a liquid outlet and gas outlet to release the separated components. In some embodiments, the vessel may be substantially cylindrical in shape (e.g., a pipe). For example, the vessel may be defined by an inner diameter (ID) or internal cross-sectional area, an outer diameter (OD) and a wall thickness (WT). In general, the outer diameter (OD), inner diameter (ID) and wall thickness (WT) of the vessel can be selected based upon system preferences.

The vessel can be made from a material with low to good gas permeability and good chemical resistance. Suitable materials include, but are not limited to, carbon steel, alloy steel (e.g., stainless steel) and plastic (e.g., polyvinyl chloride).

The vessel extends in a first direction. As used herein, the term "first direction" refers to the three dimensional orientation or position of the vessel with respect to the central axis of the curvilinear flow path. For example, the vessel may be extending in a parallel axis, an orthogonal axis or a diagonal axis with respect to the central axis of the curvilinear flow path. FIG. 2A shows a coiled tube forming a curvilinear flow path 200a. The curvilinear flow path 200a is shown having a central axis orthogonal to the X and Y axes. The vessel can extend in a first direction parallel with the Z axis (e.g. along the Z axis) or orthogonal to the X axis and the Y axis.

As used herein, the term "central axis" or "N" refers to a straight line about which the lumen of the curvilinear flow path or member may rotate about or that divides the curvilinear flow path or member along a symmetrical plane. As shown in FIG. 2A, the central axis N may be orthogonal to the X and Y axis. In some embodiments, a centrifugal force may emanate radially outward from the central axis. As shown in FIG. 2A, the centrifugal force, F or 210 may emanate radially outward in an orthogonal direction with respect to the central axis, N or 250.

Figure 8:
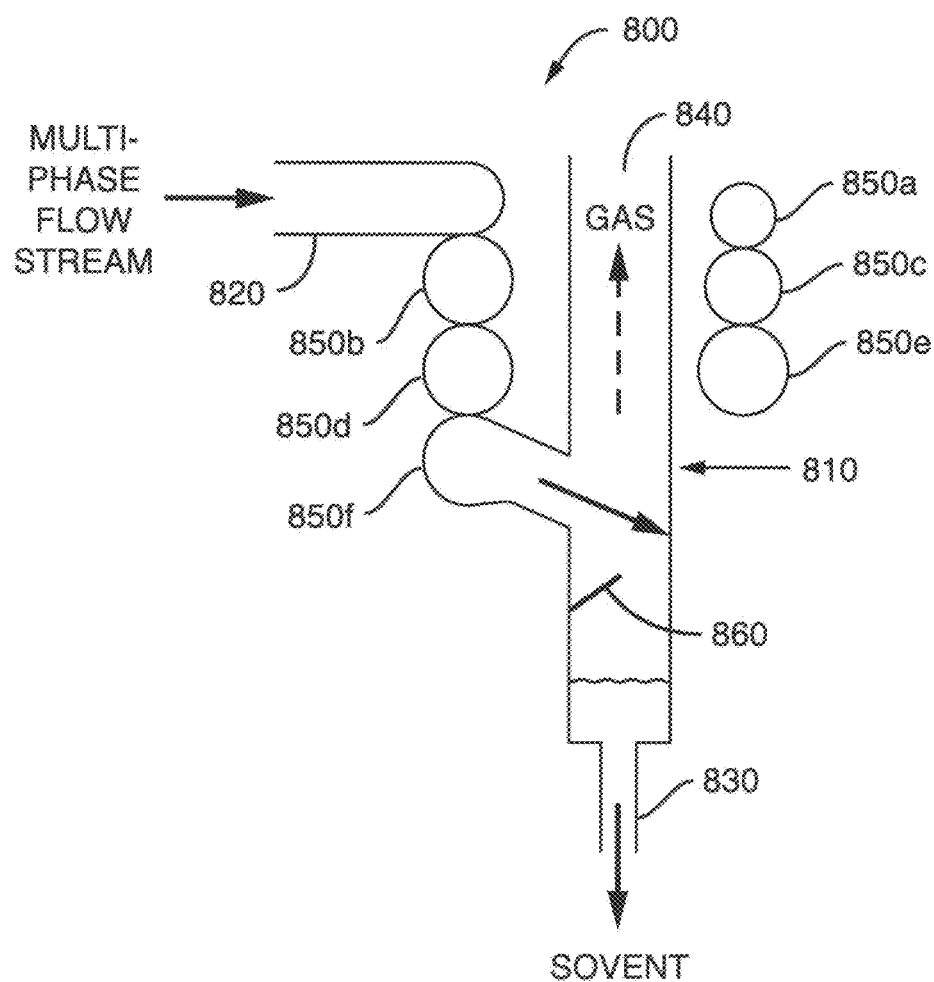
FIG. 8 illustrates yet another embodiment of a gas-liquid separator.

The vessel can also include an impact member within the vessel. As used herein, the term "impact member" refers to any surface member, or structure, that alters the direction of a flow stream. In some embodiments, at least one impact member is disposed within the vessel. As shown in FIG. 8, the impact member 860 can extend outward from an interior wall of the vessel 810. The impact member may extend from the interior wall of the vessel at an angle between about 90 degrees and about 10 degrees with respect to the interior vessel wall. Particularly, the impact member extends at an angle between about 70 and about 20 degrees. More particularly, the impact member extends at an angle between about 60 and about 30 degrees.

In the present technology, the multi-phase flow stream is inserted into the curvilinear flow path prior to receipt within a vessel.

As shown in FIG. 2A the curvilinear flow path 200a can be characterized by one or more of: its length or distance, k or 240, its outer diameter, D or 220, and the distance between consecutive coils (pitch), P or 230. The curvature ratio (d/D) can also be used to characterize the flow path.

Figure 2B:
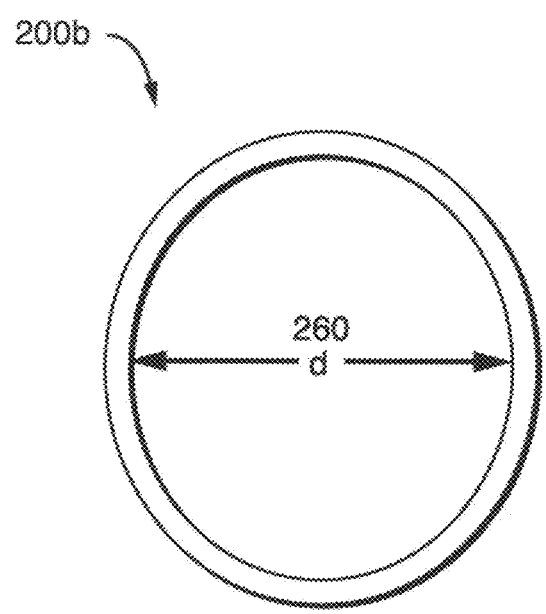
FIG. 2B schematically illustrates a cross-sectional view of the tubing comprising the curvilinear flow path of FIG. 2A.

As shown in FIG. 2B, the curvilinear flow path 200a can be further characterized by the inner diameter, d or 260 of the tubing 200b comprising the curvilinear flow path.

In various non-limiting example implementations, the curvilinear flow path can be formed with a length (k), an inner diameter (d), an outer diameter (D), a pitch (p) and a curvature ratio (d/D) based upon system preference. For example, with a k, d, D, p and d/D selected to meet space requirements of an existing system while also providing conditions for laminar flow of the multi-phase fluid during system operation.

In some embodiments, these variables (e.g., d, D, and p) remain constant over a first direction or along length, k. In other embodiments, one or more of these variables can vary. That is, one or more of these variables can have a value that increases or decreases over a first direction or along length k. In addition, in certain embodiments, one or more of these variables can change over time or can be activated to change based on a system requirement or operator preference.

In some embodiments, the inner diameter (d) remains constant over a first direction or along length, k. In other embodiments, the inner diameter (d) can vary over a first direction or along length, k. The variation in d can be a constant decrease or increase over a first direction or along length, k, intermittent decrease or increase over a first direction or along length, k, or both.

In some embodiments, the pitch (p) remains constant over a first direction or along length, k. In other embodiments, the pitch (p) can vary over a first direction or along length, k. The variation in p can be a constant decrease or increase over a first direction or along length, k, intermittent decrease or increase over a first direction or along length, k, or both.

In some embodiments, the outer diameter (D) remains constant over a first direction or along length, k. In other embodiments, the outer diameter (D) can vary over a first direction or along length, k. The variation in D can be a constant decrease or increase over a first direction or along length, k, intermittent decrease or increase over a first direction or along length, k, or both.

In some embodiments, the curvature ratio (d/D) remains constant over a first direction or along length, k. In other embodiments, the curvature ratio (d/D) can vary over a first direction or along length, k. The variation in d/D can be a constant decrease or increase over a first direction or along length, k, intermittent decrease or increase over a first direction or along length, k, or both.

Figure 12:
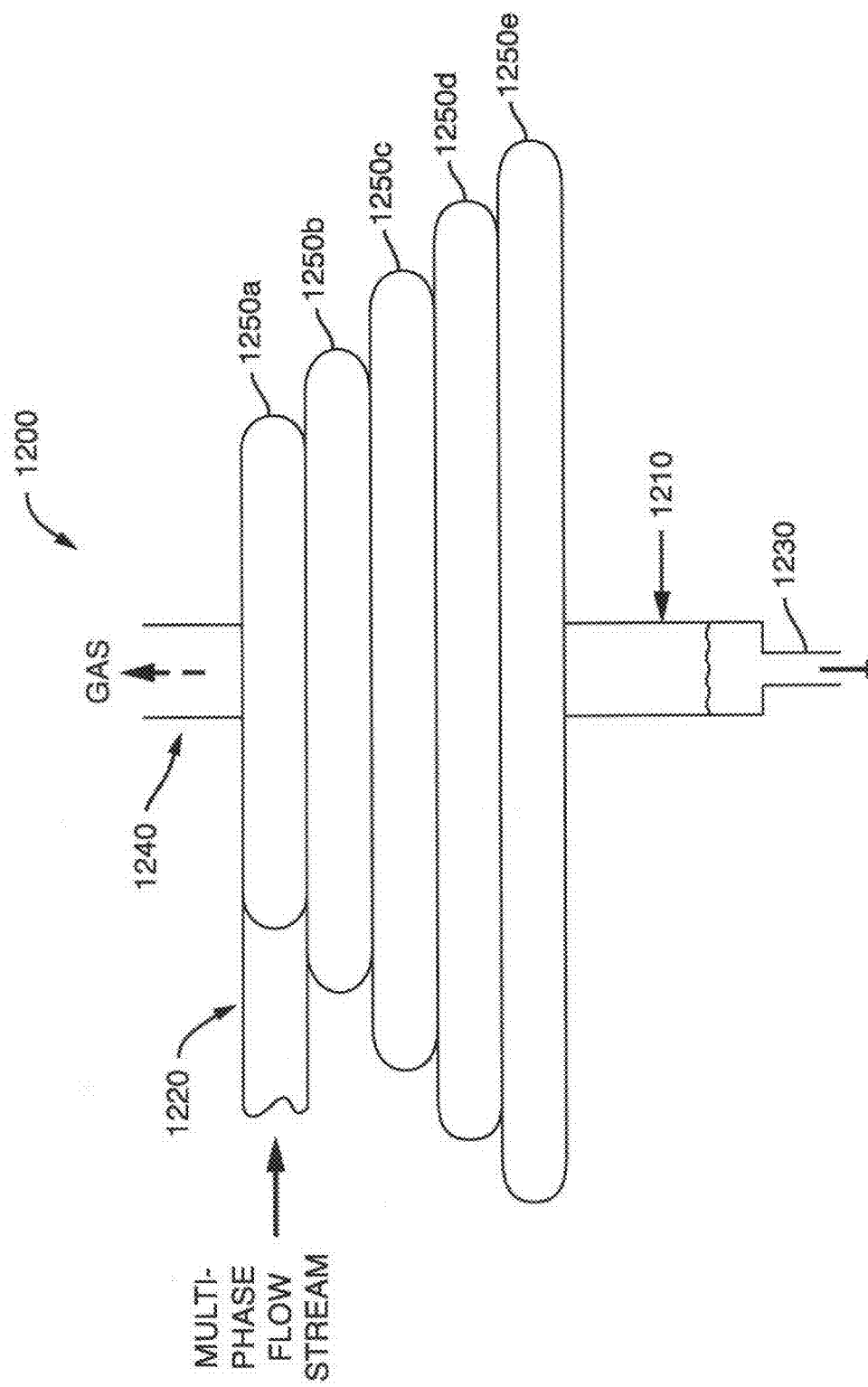
FIG. 12 illustrates another embodiment of a gas-liquid separator including increasingly larger coils.

As shown in FIG. 12, the outer diameter (D) increases over the length k, i.e., the coils get bigger, from the inlet 1120 to the vessel 1110. The percent increase for any one of these variables over k can be up to 5%, 10%, 20%, 40%, 60%, 80%, 100%, 500% or more.

In one embodiment, all three of the variables d, D and p remain constant over the length k (i.e. from the inlet to the vessel). See, for example, the curvilinear flow path member shown in FIG. 6.

Without wishing to be bound by theory to a particular mechanism of action, the separation of the liquid and the gas can be achieved by using the curvilinear flow path (e.g., coiled tube, single ring, etc.) to force the gas-liquid mixture to follow a curved path. The curvilinear motion results in a secondary flow field effect acting perpendicular to the direction of a primary flow field. The secondary flow field effect can produce a shift in the velocity of the primary flow field which forces the liquid (e.g., methanol) to collect or pool along the inner bend radius or inner curvature portion. The collected or pooled liquid can then be separated more readily, such as by any of the inertial techniques. In one embodiment, the curvilinear flow path is adapted (e.g. sized, shaped, configured) to produce a shift in the flow velocity of an axial flow field as a result of a secondary flow field effect acting perpendicular to a primary flow field. In some embodiments, the secondary flow field effect in combination with a centrifugal force drives a liquid within the multiphase flow stream to an inner bend radius of the member.

Two general types of flow can occur when a fluid flows through a closed tube or pipe, laminar flow or turbulent flow. The Reynolds number is typically used to characterize different flow regimes within a similar fluid (e.g., laminar or turbulent flow). In general, laminar flow occurs at low Reynolds numbers, where viscous forces are dominant, and is characterized by smooth, constant fluid motion. Turbulent flow generally occurs at high Reynolds numbers and is dominated by inertial forces, which tend to produce flow instabilities (e.g., chaotic eddies and vortices). For flow within a pipe or tube, the Reynolds number (Re) is generally defined as:

$$Re = \frac{\rho v D_H}{\mu} = \frac{v D_H}{v} = \frac{Q D_H}{vA},$$

where $\rho$ is the density of the fluid (kg/m$^3$); v is the mean velocity of the fluid (m/s); $D_H$ is the hydraulic diameter of the pipe; $\mu$ is the dynamic viscosity of the fluid (Pa·s=N·s/m$^2$=kg/(m·s)); v is the kinematic viscosity (v=$\mu$/$\rho$) (m$^2$/s); Q is the volumetric flow rate (m$^3$/s); and A is the pipe cross-sectional area (m$^2$).

Figure 3A:
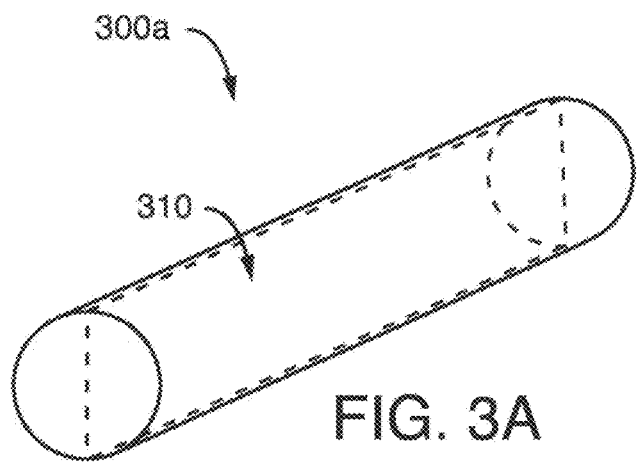
FIGS. 3A, 3B, and 3C schematically illustrate tubing forming a straight flow path (FIG. 3A), a cross-sectional view of an exemplary primary flow field within a straight flow path (FIG. 3B), and a topographical view of the velocity profile of an exemplary primary flow field within a straight flow path (FIG. 3C).
Figure 3B:
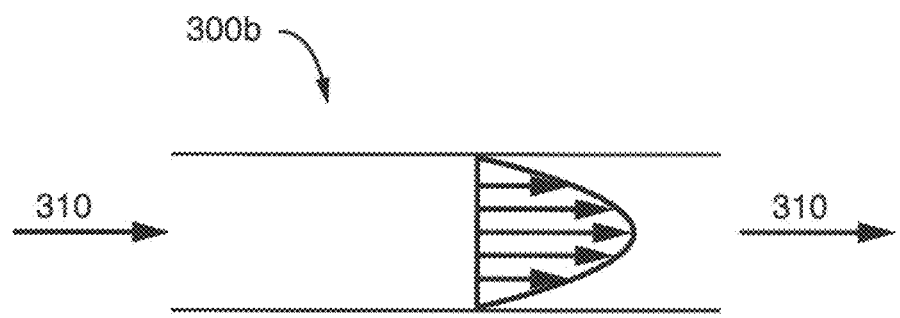
Figure 3C:
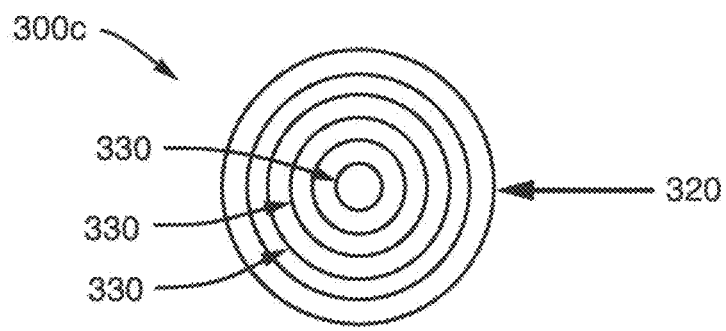

FIGS. 3A and 3B depict cross sectional views of a substantially laminar primary flow field 310 flowing through a straight tube 300a and 300b. The primary flow field flows in parallel layers with no cross currents perpendicular to the primary direction of flow. As shown in FIG. 3C, this is turn results in a relatively uniform velocity profile 300c comprised of substantially uniform iso-velocity lines or contours 320 and 330.

In curvilinear channels, turbulent flow may begin at a higher Reynolds number (Re$_c$) given by:

$$Re_c = \frac{2300}{1 - \left[1 - \left(\frac{D_0}{2000D}\right)^{0.4}\right]^{22}}$$

and in turbulent flow, the coiled tube coefficient K$_\varphi$ is given by the equation:

$$K_\varphi = 1 + 1.68\left(\frac{D}{D_{coil}}\right)^{0.65}$$

The Dean number (D) is a dimensionless group in fluid mechanics, used to calculate the flow in curved pipes and channels. In general, the Dean number is defined for a flow in a pipe or tube as:

$$D = \frac{\rho V d}{\mu}\left(\frac{d}{2R}\right)^{1/2},$$

where $\rho$ is the density of the fluid; V is the axial velocity scale; d is the diameter; $\mu$ is the dynamic viscosity; and R is the radius of curvature of the path of the channel. Thus, the Dean number is the product of the Reynolds number and the square root of the curvature ratio.

The centripetal force is the force required to keep an object moving in a curved path and that is directed inward toward the center of rotation. The magnitude of the centripetal force on an object of mass (m) moving at tangential speed (v) along a path with radius of curvature (r) is defined as:

$$F_c = mv^2/r.$$

Figure 4:
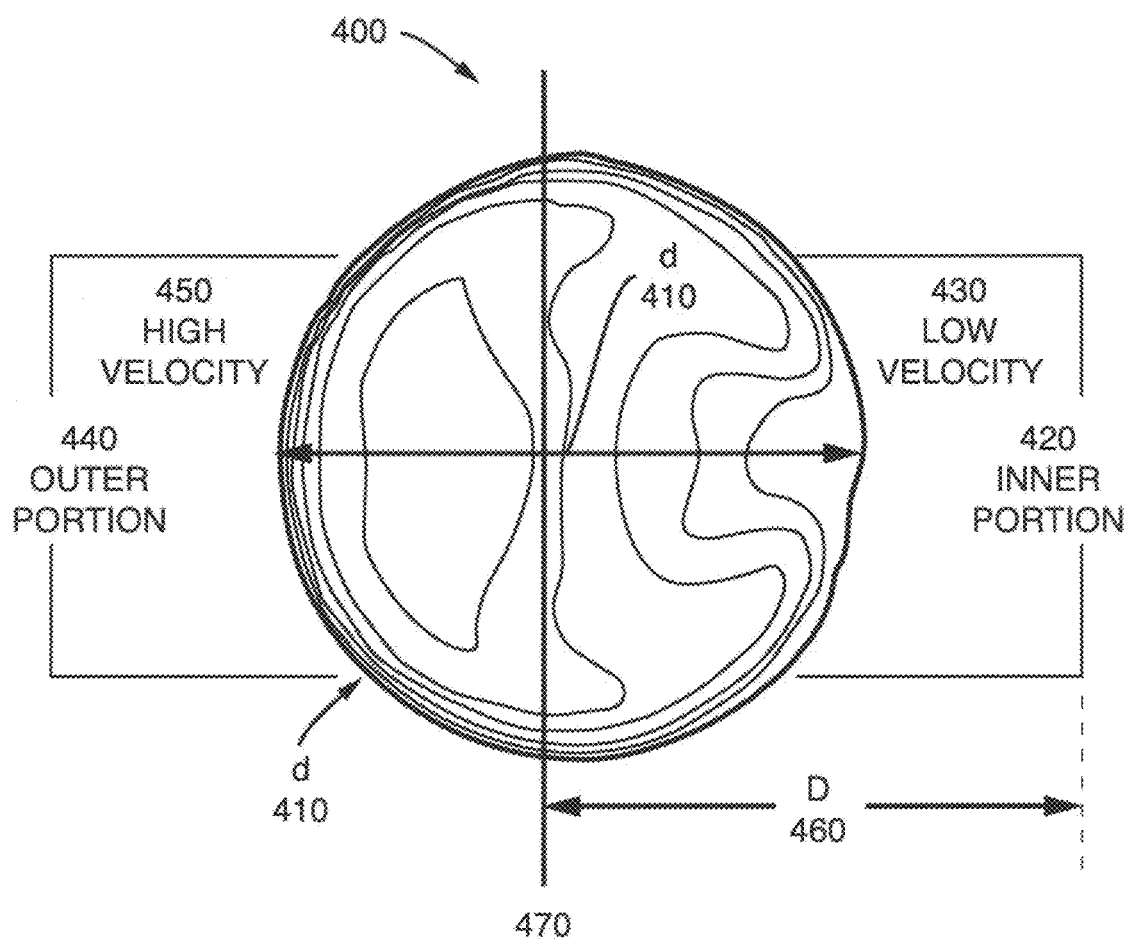
FIG. 4 schematically illustrates a topographical view of the velocity profile of an exemplary primary flow stream within a curvilinear flow path.

FIG. 4 depicts an exemplary topographical view of the velocity profile 400 of a primary flow field within a curvilinear flow path having an axis 470, an inner diameter, d or 410, and an outer diameter, D or 460. Flow in the curvilinear flow path can experience a centrifugal force, which biases the parabolic velocity towards the outer curvature portion 440 of the curvilinear flow path and leads to the generation of a low velocity region 430. A high velocity region 450 is also generated towards the outer curvature portion 440. To balance this centrifugal force, a pressure gradient is generated in the radial direction of the curvilinear flow path, with the pressure being the greatest at the outer curvature portion 440 and the least at the inner curvature portion 420.

Figure 5:
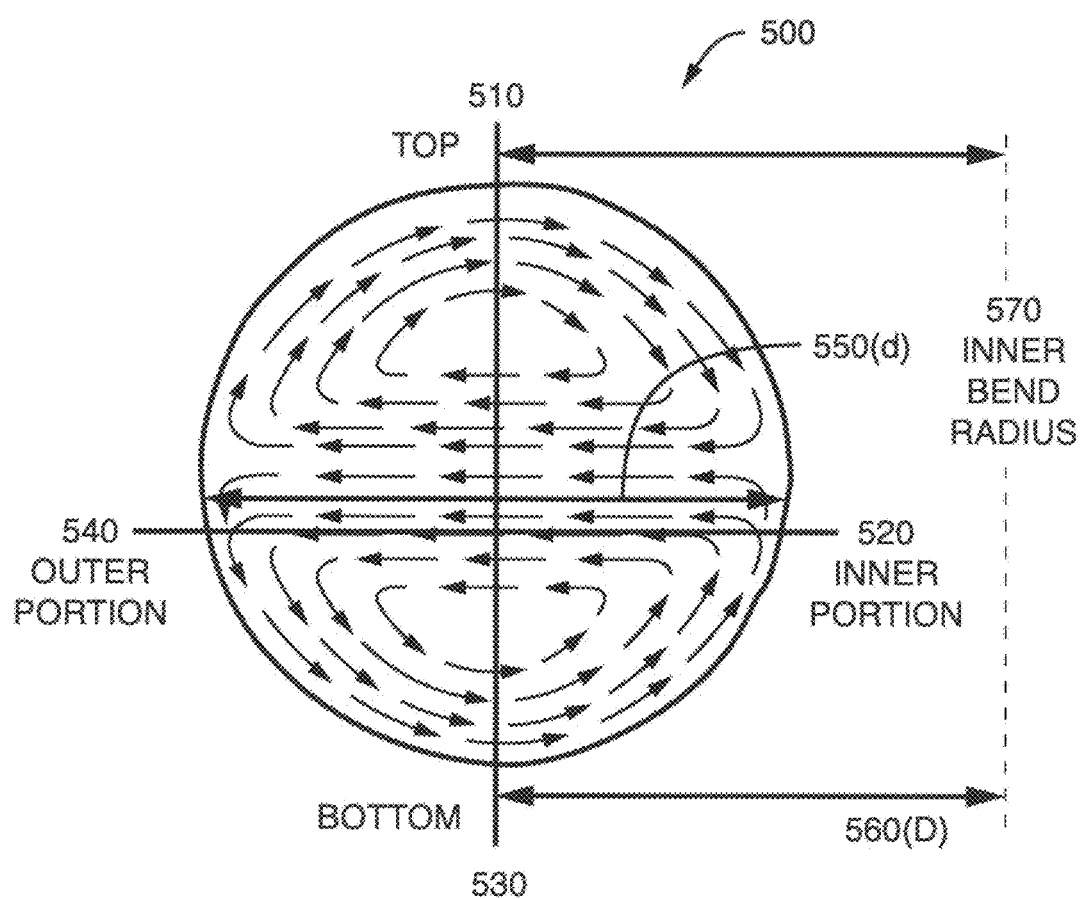
FIG. 5 schematically illustrates a topographical view of a secondary flow superimposed on the primary flow within a curvilinear flow path.

FIG. 5 depicts a topographical view of a secondary flow field superimposed on a primary flow field 500 within the curvilinear flow path. The curvilinear flow path comprises an outer curvature portion 540, an inner curvature portion 520, a top curvature portion 510, a bottom curvature portion 530, an outer diameter, D or 560, an inner diameter, d or 550, and an inner bend radius 570. The curvature portions described herein comprise, at least in part, a portion of a perimeter wall of the curvilinear flow path.

Flow in a curvilinear flow path can lead to the generation of a secondary flow field in planes perpendicular to the central axis of the curvilinear flow path. In general, due to its reduced centrifugal force, the fluid near the top 510 and bottom 530 curvature portions of the curvilinear flow path moves more slowly than that near the central plane of the curvilinear flow path, and therefore requires a smaller pressure gradient. This results in the generation of a secondary flow field effect in which the fluid near the top 510 and bottom 530 curvature portions of the curvilinear flow path moves inwards towards the midpoint of the central axis 530 and the fluid at or near the midpoint of the central axis 530 moves outwards. This in turn alters the axial velocity of the flow through the curvilinear flow path and results in the more accelerated fluid located at or near the midpoint of the central axis 530 to force the fluid at the outer curvature portion 540 to the top 510 and bottom 530 curvature portions of the curvilinear flow path then inwards along the top 510 and bottom 530 curvature portions towards the inner bend radius 570. Thus, the more accelerated fluid is continuously transported to the outer curvature portion 540 and the less accelerated fluid to the inner curvature portion 520, ultimately reducing the flux through the curvilinear flow path.

In one embodiment, the direction of the secondary flow field effect, at the center of the tube, is towards the outer curvature portion 540. When the secondary flow field effect reaches the outer wall 540, it can flow back inwards along the inner wall 520, i.e., a portion of the perimeter of the inner curvature portion 520 of the tube. For example, the secondary flow field can be in contact with at least a portion of the outer curvature perimeter wall 540. There are at least two separate secondary flow field effect regions, one on the top half of the tube and another on the bottom half. The secondary flow field effect can cause the liquid particles to hit the outer wall 540 and then flow along the top wall, i.e., a portion of the outer wall 540 and/or inner wall 520 located in the top half of the tube, and bottom wall, i.e., a portion of the outer wall 540 and/or inner wall 520 located in the bottom half of the tube, of the tube and reach the inner portion 520 or wall of the inner bend radius 570. For example, the inner curvature portion 520 of the curvilinear path can include an inner wall defining the curvilinear flow path. The secondary flow field effect can be in contact with at least a portion of the inner curvature perimeter wall. The liquid droplets coalesce as they travel along the tube wall and pool at the inner bend radius 570. The coalesced liquid, which has a larger mass than a droplet, can be separated by causing a sudden direction change, such as by passing through a T-connector (such as a T-connector located at the inlet to the vessel). The sudden direction change can cause the coalesced co-solvent to maintain its path due to inertia whereas the carbon dioxide (gas) can follow the direction change due to its relatively lower inertia.

The curvilinear flow path can be made out of any material compatible with chromatography mobile phases, including carbon dioxide based chromatographic separation systems. The flow path can be made using plastic or stainless steel tubing. For example, the flow path can be made using, at least in part, a flexible chemical resistant polymer, such as fluoropolymer tubing (e.g. Tygon® tubing available from Saint Gobain Performance Plastics). The flow path can be made from other materials as well. For example, in one embodiment, the curvilinear flow path is formed from an expandable material. That is, the tubing or channel forming the flow path is made from a material that can expand radially and/or axially expand. For example, upon application of a chemical, physical, or mechanical stimulus. In one embodiment, the shape of the curvilinear flow path has a substantially coiled shape. In certain embodiments, the coil is sized/shaped to reduce turbulent flow within the curvilinear flow path. In general, the inner diameter of the tubing (i.e. defining the diameter of the flow path) can be selected based on system preferences.

In some embodiments, the separator is adapted to produce a laminar flow. The laminar flow may be produced by sizing the d/D ratio to maximize the velocity of the fluid entering the separator. In other embodiments, the separator is adapted to minimize turbulent flow. The turbulent flow can be minimized by sizing the d/D ratio to maximize the velocity of the fluid entering the separator. In one embodiment, the separator is sized to produce laminar or mostly laminar flow at a designated operating point. In other embodiments, the d/D ratio varies during operation to allow for increased control of the state of the fluid flow.

Figure 6:
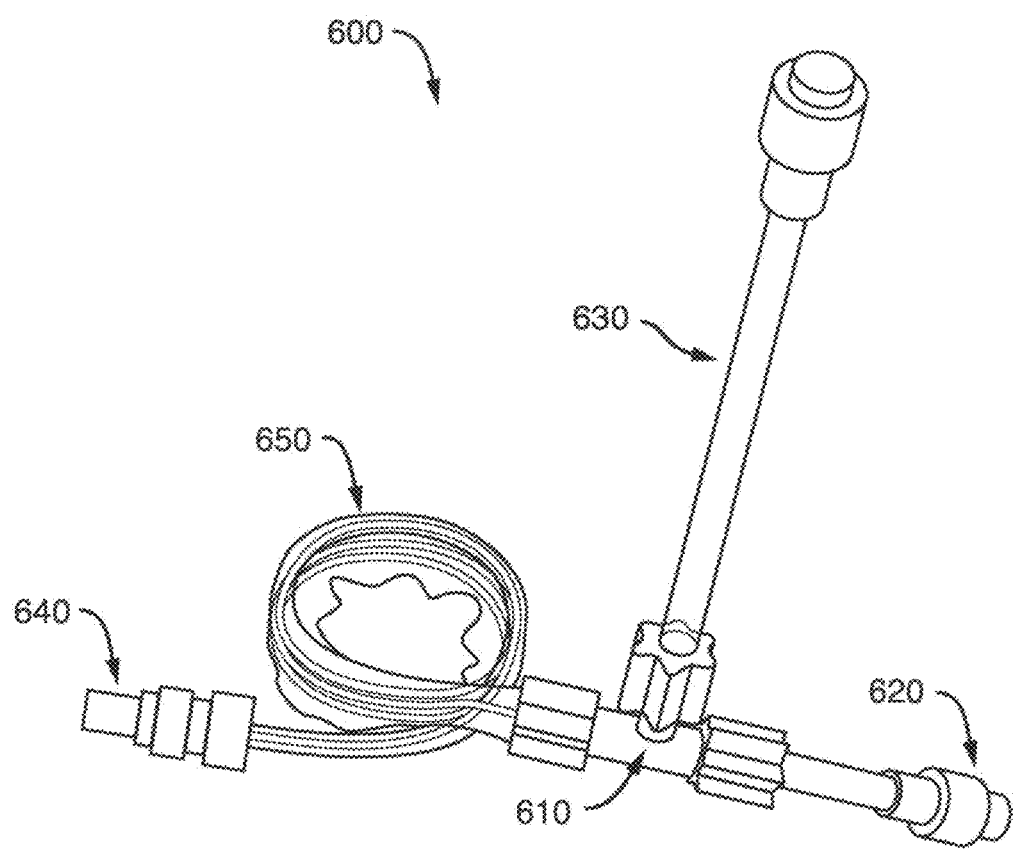
FIG. 6 illustrates a gas-liquid separator, according to an embodiment of the present technology.

FIG. 6 is an exemplary gas-liquid separator 600. The gas-liquid separator 600 comprises a vessel 610. Vessel 610 is substantially cylindrical, extends in horizontal (X-axis) direction (e.g. along the X-axis), and has a solvent outlet 620 and a gas outlet 630. To separate phases in the gas-liquid separator 600, a multi-phase flow stream enters vessel 610 through inlet 640. Inlet 640 is fluidly connected to vessel 610 through a curvilinear path 650. Curvilinear flow path 650, in this embodiment, provides a means for connecting inlet 640 to vessel 610 and has a substantially coiled shape.

In this embodiment, flow path 650 includes 3 stacked coils. Each coil having substantially the same dimensions. In this embodiment, the curvilinear flow path 650 is formed of fluoropolymer tubing.

Figure 7:
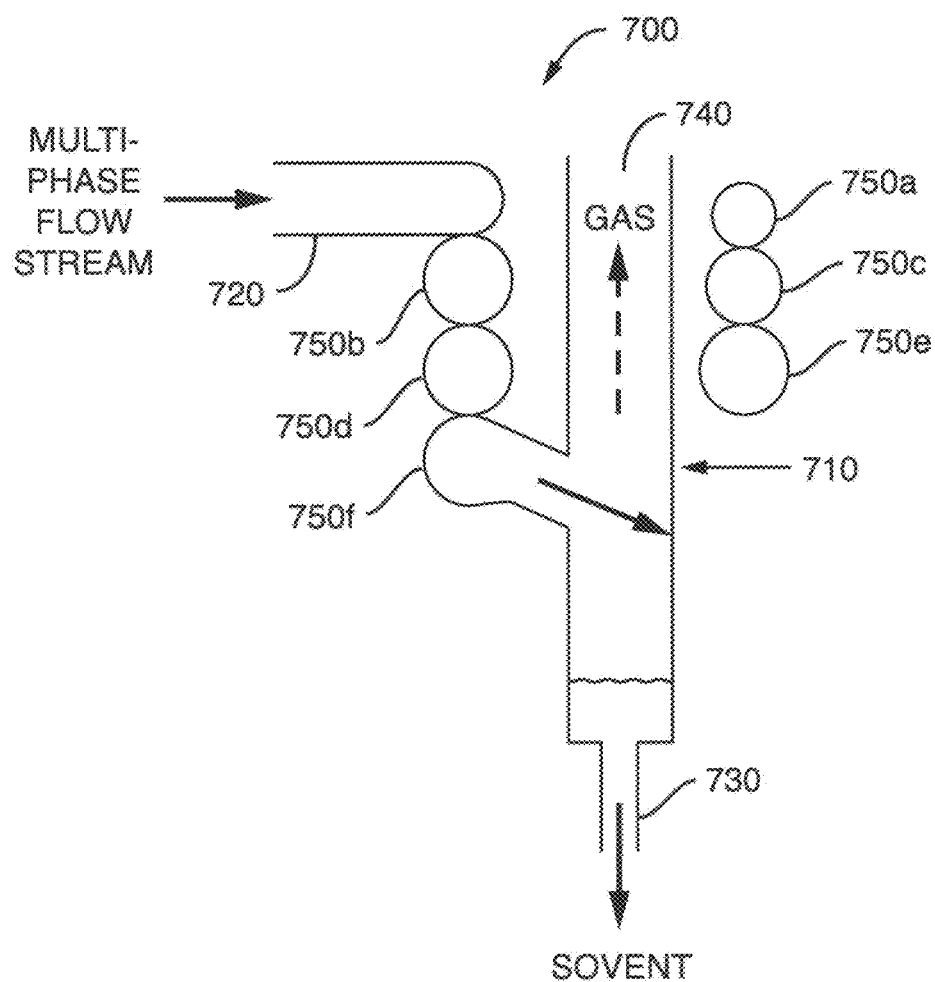
FIG. 7 illustrates a gas-liquid separator, according to another embodiment the present technology.

FIG. 7 is a longitudinal cross-section of a second exemplary gas-liquid separator 700. The gas-liquid separator 700 comprises a vessel 710, which is substantially cylindrical, extends in a vertical (Y-axis) direction (e.g. along the Y-axis), and has a solvent outlet 730 and a gas outlet 740. To separate phases in the gas-liquid separator 700, a multi-phase flow stream enters vessel 710 through inlet 720. Inlet 720 is fluidly connected to vessel 710 through a curvilinear path 750. Curvilinear flow path 750, in this embodiment, provides a means for connecting inlet 720 to vessel 710 and has a substantially coiled shape, comprising three and a half coils about the vessel 710. That is, a first coil extends from inlet 720 around vessel 710 and has tubing (shown in cross-section as rings 750a-f forming the coiled tubing). The curvilinear flow path 750 fluidly connects to vessel 710 at a substantially right angle after passing through a portion of a coil identified as 750f.

FIG. 8 shows an alternate embodiment of the separator technology. FIG. 8 depicts a longitudinal cross-section of the gas-liquid separator 800. In this figure there is no substantial change to the arrangement of the vessel 810, inlet 820, solvent outlet 830, gas outlet 840, or curvilinear flow path 850a-f presented in FIG. 7, but an impact member 860 is optionally disposed within vessel 810. The impact member extends from a wall of vessel 810 and provides a secondary surface for impaction and final separation of gas and liquid phases.

Figure 9:
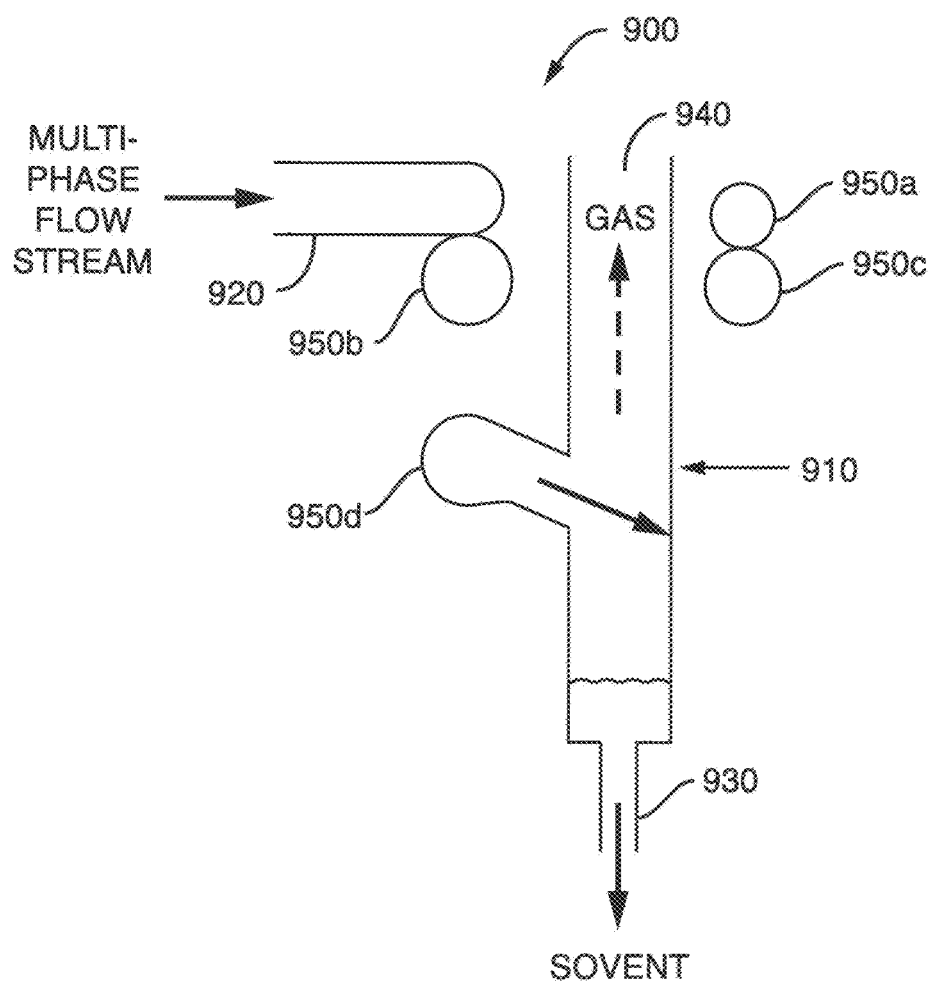
FIGS. 9 and 10 illustrate exemplary gas-liquid separators including different sized curvilinear flow paths.

FIG. 9 shows an alternate embodiment of the separator technology, a longitudinal cross-section of the gas-liquid separator 900. In this figure there is no substantial change to the arrangement of the vessel 910, inlet 920, solvent outlet 930 or gas outlet 940 (as presented above), but the curvilinear flow path 950 comprises two and a half coils about the vessel 910 (instead of three and a half as shown in FIG. 7). That is, a first coil extends from inlet 920 around vessel 910 and has cross-sectional tubing 950a-d.

Figure 10:
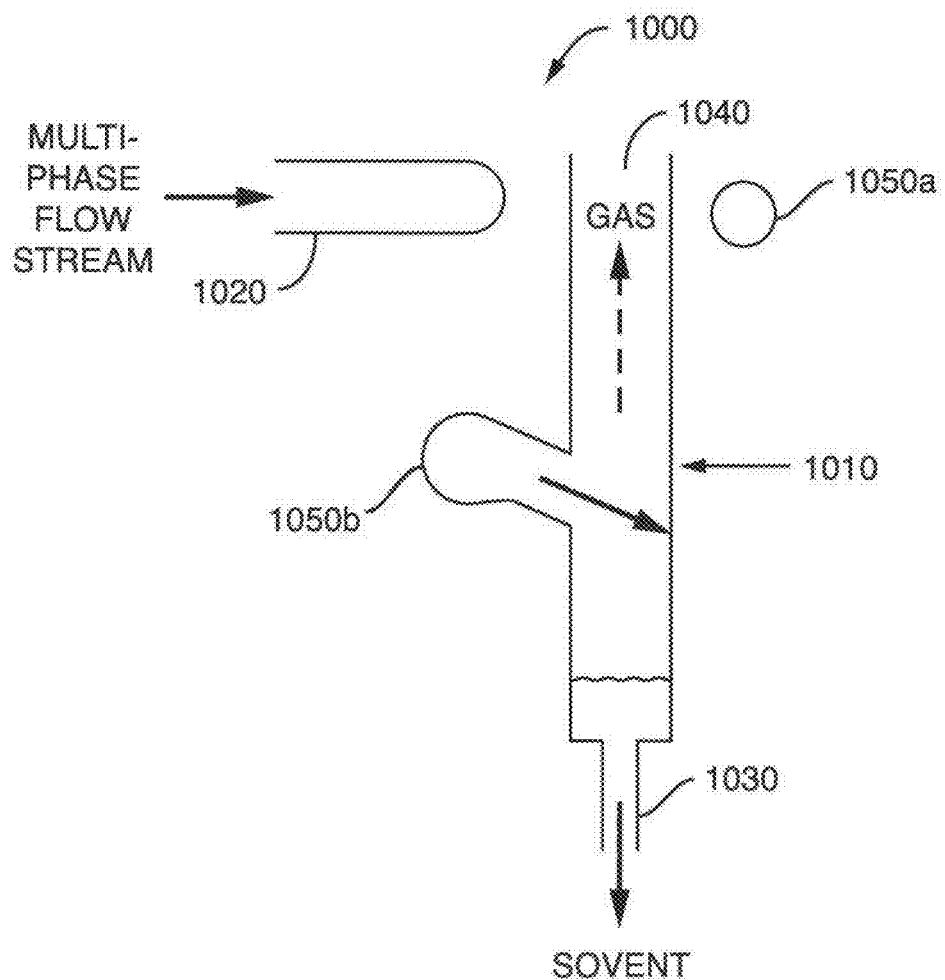

FIG. 10 depicts another embodiment of a gas-liquid separator 1000 in a longitudinal cross-sectional form. Once again, there is no substantial change to the arrangement of the vessel 1010, inlet 1020, solvent outlet 1030 or gas outlet 1040 as previously presented, but the curvilinear flow path 1050 comprises one and a half coils about the vessel 1010. That is, a first coil extends from inlet 1020 around vessel 1010 and has cross-sectional tubing 1050a-b.

Figure 11:
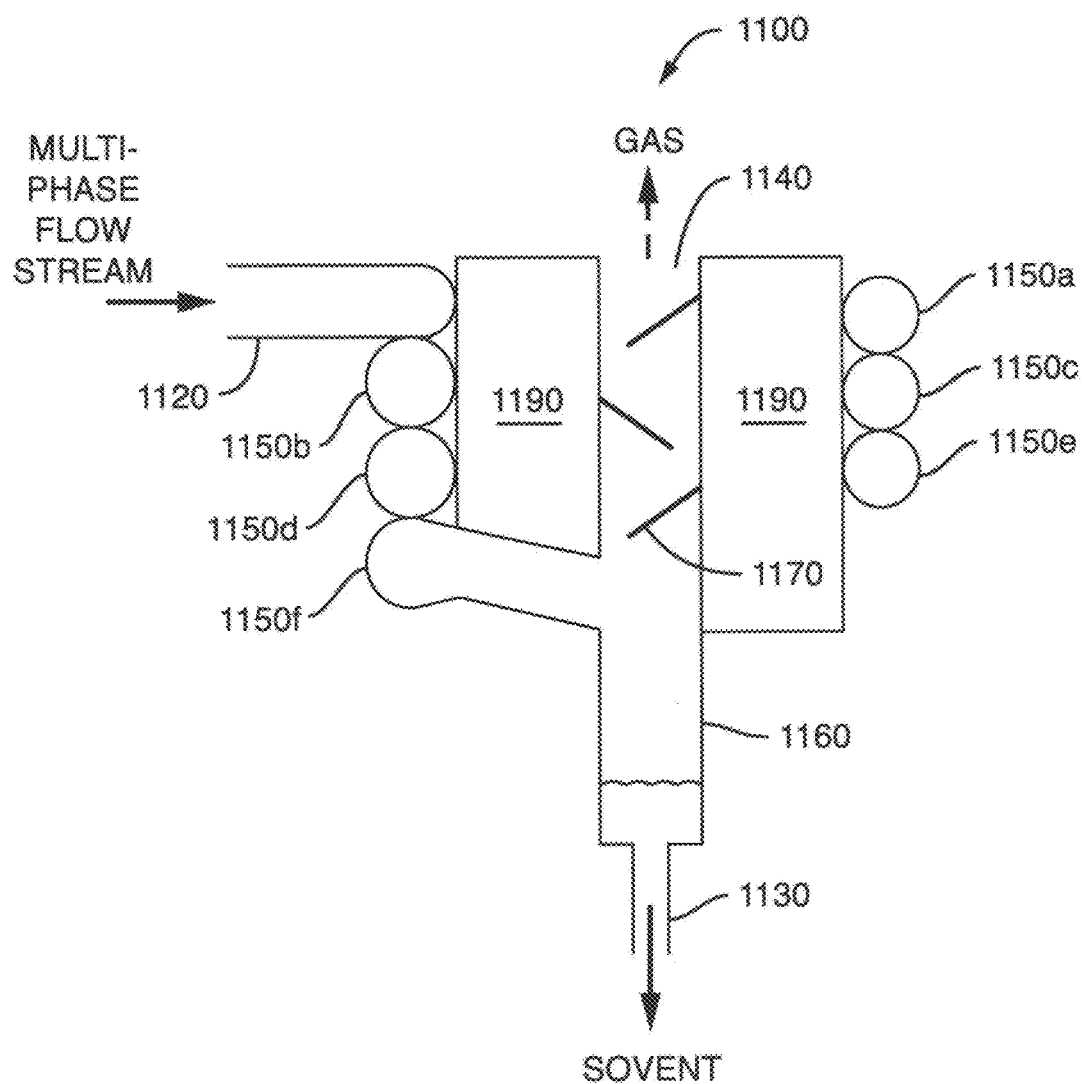
FIG. 11 illustrates another embodiment of a gas-liquid separator including uniform coils.

FIG. 11 is a longitudinal cross-section of yet another exemplary gas-liquid separator 1100. The gas-liquid separator 1100 comprises a vessel 1160, which is substantially cylindrical, extends in a vertical (Y-axis) direction (e.g. along the Y-axis), and has solvent outlet 1130 and a gas outlet 1140. Disposed within the vessel may be one or more impact members, 1170. To separate phases in the gas-liquid separator 1100, a multi-phase flow stream enters vessel 1160 through inlet 1120. Inlet 1120 is fluidly connected to vessel 1160 through a curvilinear path 1150. Curvilinear flow path 1150, in this embodiment, provides a means for connecting inlet 1120 to vessel 1160 and has a substantially coiled shape, comprising three and a half coils about the vessel 1160. That is, a first coil extends from inlet 1120 around vessel 1160. As FIG. 11 is a cross-sectional view, parts 1150a-f depict a cross-sectional cut of the edges of the tubing forming the curvilinear path 1150. In this embodiments, a housing 1190 forms a body or structure separating a portion of the vessel 1160 from the coiled curvilinear flow path 1150. That is, housing 1190 forms a structure to secure and position the curvilinear flow path 1150 and vessel 1160. In some embodiments, housing 1190 can include actuators to control the movement and positioning of the loops (e.g. 1150b-1150c) of the curvilinear flow path 1150.

FIG. 12 is a longitudinal cross-section of another exemplary gas-liquid separator 1200. The gas-liquid separator 1200 comprises a vessel 1210, which is substantially cylindrical, extends in a vertical (Y-axis) direction (e.g. along the Y-axis), and has solvent outlet 1230 and a gas outlet 1240. To separate phases in the gas-liquid separator 1200, a multi-phase flow stream enters vessel 1210 through inlet 1220. Inlet 1220 is fluidly connected to vessel 1210 through a curvilinear path 1250. Curvilinear flow path 1250, in this embodiment, provides a means for connecting inlet 1220 to vessel 1210 and has a substantially coiled shape, comprising five and a half coils about the vessel 1210. That is, a first coil extends from inlet 1220 around vessel 1210 and forms five full loops 1250a-e. Each consecutive loop increases in size from the inlet to the vessel. As a result, the d/D ratio varies along the longitudinal axis of curvilinear path 1250. In this embodiment, varying the d/D ratio during operation allows for better control of the state of fluid flow within the gas-liquid separator for particular operating conditions in a system.

In another embodiment, the present technology relates to a phase separation system, including a mixing unit for mixing together at least two different fluid sources; a gas-liquid separator, located downstream and in fluid communication with the mixing unit, the gas-liquid separator including a vessel extending in a first direction having a liquid outlet for discharging a liquid after separation of the liquid from a multi-phase flow stream and a gas outlet for discharging a gas after separation of the gas from the multi-phase flow stream; and a vessel inlet for receiving a multi-phase flow stream, wherein the vessel inlet is fluidly connected to the vessel through a member having a lumen about a central axis, the member comprising a curvilinear flow path that extends a distance over the first direction. The system can further include a chromatographic column positioned downstream of the mixing unit and upstream of the gas-liquid separator.

The mixing unit used in the present technology can be any mixing unit used in chromatography and capable of mixing at least two different fluid sources to create a multi-phase flow stream. For example, the mixing unit can be a T-connector or a static bead mixer. In one embodiment, the mixing unit includes hardware to create a pressure drop (ΔP) within the mixed flow stream to generate the multi-phase flow stream. That is, the combination of fluids and ΔP results in a multi-phase flow stream.

Figure 13:
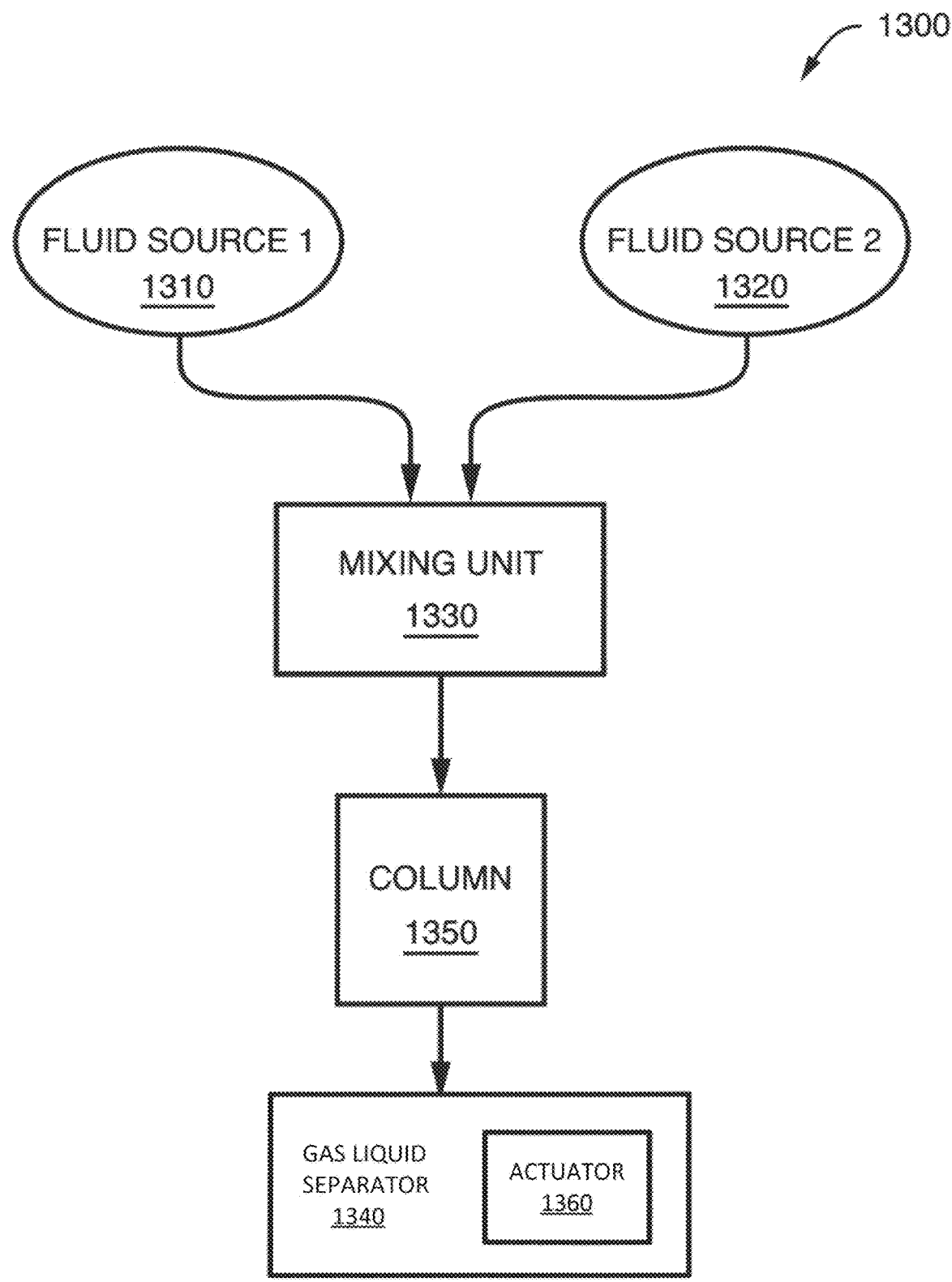
FIG. 13 is a block diagram of a phase separation system including both a gas-liquid separator and a chromatography column.

FIG. 13 is a block diagram of an exemplary phase separation system 1300, comprising fluid source 1 (1310), fluid source 2 (1320), a mixing unit 1330, a chromatography column 1350 and the gas-liquid separator 1340. Typically, fluid source 1 (1310) and fluid source 2 (1320) contain different fluids, e.g., $CO_2$ as source 1 and methanol as source 2.

In one embodiment, the gas-liquid separator 1340 further comprises an actuator 1360. In some embodiments, the actuator 1360 is adapted to produce a change in the dimensions (e.g., length (k), inner diameter (d)) or outer diameter (D), See FIG. 1) of the member or curvilinear flow path along the first direction. That is, one or more of these variable can have a value that increases or decreases along the first direction. In addition, in certain embodiments, one or more of these variables can change over time based on a system requirement or operator preference.

In some embodiments, the actuator 1360 in combination with an operator or a controller and detector is switched on into action to cause a change in dimension of some portion of the curvilinear flow path connected to the vessel of the gas-liquid separator. For example, upon a detection of a change in conditions that increases turbulent flow, the actuator 1360 switches on to increase the length (k) or pitch (p) to change conditions.

In some embodiments, the length (k), pitch (p), inner diameter (d) or outer diameter (D) of some portion of the curvilinear flow path remain constant over time. In other embodiments, the length (k), pitch (p), inner diameter (d) or outer diameter (D) can vary over time. The variation in k, p, d or D can be a constant decrease or increase over time or an, intermittent decrease or increase over time.

In some embodiments, the length (k) remains constant. For example, prior to operation of the gas-liquid separator the length (k) of the curvilinear flow path is 1 meter and remains 1 meter long throughout the operation of the gas-liquid separator. In other embodiments, the length (k) varies over time. In some embodiments, the length (k) expands in a longitudinal direction upon a chemical, physical, or mechanical change. In some embodiments, an actuator 1360 switches on to increase the length (k) by 5%, 10%, 20%, 40%, or more. For example, upon a detection of a change in conditions that increases turbulent flow, the length (k) increases from 0.2 m to 0.3 m.

The pitch (p) between each coil of the curvilinear flow path can be the same or different. For example, the pitch (p) between the first and second ring of the curvilinear flow path is 1 mm and the pitch between the fourth and fifth ring is 3 mm.

In some embodiments, the pitch (p) of the curvilinear flow path remains constant. For example, prior to operation of the gas-liquid separator the pitch (p) between the first and second ring of the curvilinear flow path is 1 mm and the pitch between the fourth and fifth ring is 3 mm and these values stay the same throughout the operation of the of the gas-liquid separator. In other embodiments, the pitch (p) varies over time. In some embodiments, an actuator 1360 switches on to increase the pitch (p) by 5%, 10%, 20%, 40%, or more during operation. For example, the distance between the first and second ring of the curvilinear flow path is 1 mm and the pitch between the fourth and fifth ring changes from 3 mm to 5 mm during operation.

In some embodiments, the outer diameter (D) remains constant. For example, prior to operation of the gas-liquid separator the outer diameter (D) of the curvilinear flow path is 0.1 m and remains 0.1 m throughout the operation of the gas-liquid separator. In other embodiments, the outer diameter (D) varies over time. In some embodiments, the outer diameter (D) expands in a horizontal direction upon a chemical, physical, or mechanical change. In some embodiments, an actuator 1360 switches on to increase the outer diameter (D) by 5%, 10%, 20%, 40%, or more during operation. For example, upon a detection of a change in conditions that increases turbulent flow, the outer diameter (D) increases from 0.1 m to 0.15 m, i.e., the coils get bigger.

In some embodiments, the inner diameter (d) remains constant. For example, prior to operation of the gas-liquid separator the inner diameter (d) of the curvilinear flow path is 2 mm and remains 2 mm throughout the operation of the gas-liquid separator. In other embodiments, the inner diameter (d) varies over time. In some embodiments, the inner diameter (d) expands radially upon a chemical, physical, or mechanical change. In some embodiments, an actuator 1360 switches on to increase the inner diameter (d) by 5%, 10%, 20%, 40%, or more during operation. For example, upon a detection of a change in conditions that increases turbulent flow, the inner diameter (d) increases from 2 mm to 2.5 mm, i.e., the tubing expands or swells.

Figure 14:
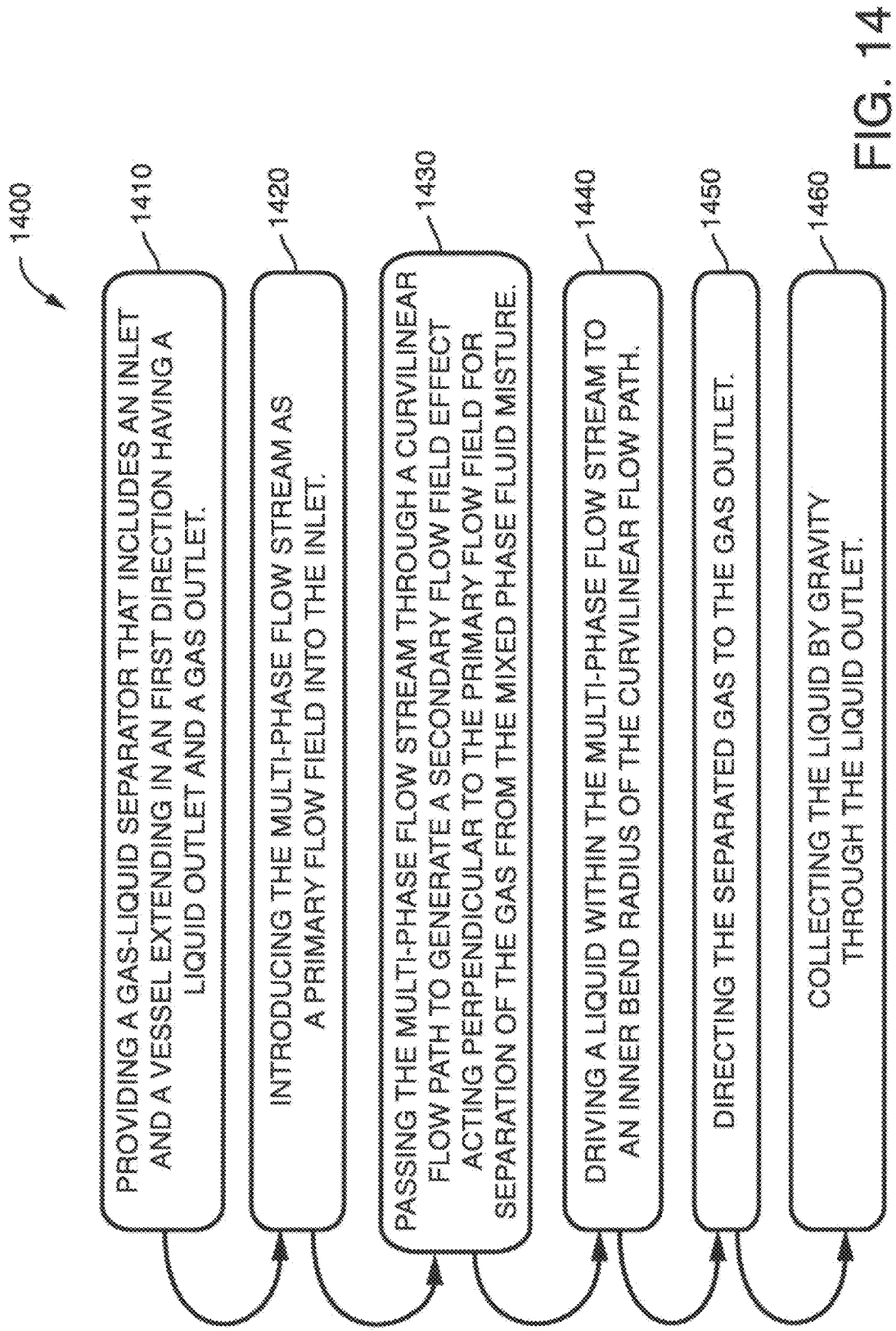
FIG. 14 is a flow chart of an exemplary method for separating a multi-phase flow stream into a gas and a liquid using a gas-liquid separator of the present technology.

In another embodiment, the present technology relates to a method for separating a multi-phase flow stream into a gas and a liquid within a gas-liquid separator. FIG. 14 is a flow chart of an exemplary method 1400 for separating a multi-phase flow stream into a gas and a liquid within an exemplary gas-liquid separator, method 1400 includes the following steps: (1410) providing a gas-liquid separator that includes an inlet and a vessel extending in an first direction having a liquid outlet and a gas outlet; (1420) introducing the multi-phase flow stream as a primary flow field into the inlet; (1430) passing the multi-phase flow stream through a curvilinear flow path to generate a secondary flow field effect acting perpendicular to the primary flow field for separation of the gas from the flow stream; (1440) driving a liquid within the multi-phase flow stream to an inner bend radius of the curvilinear flow path; (1450) directing the separated gas to the gas outlet; and (1460) collecting the liquid by gravity through the liquid outlet. In general, method 1400 allows for a better separation of phases due, at least in part, to the creation of a secondary flow field effect to reduce turbulent flow conditions during gas-liquid separation. The generation or creation of a secondary flow field effect is developed, at least in part, by the confined curving flow path connecting the inlet to the vessel for separation.

The multi-phase flow stream can be introduced to the system by standard techniques for managing fluid flow in chromatography. The multi-phase flow stream can be passed through the curvilinear flow path by directing substantially all, a substantial portion of, or a fraction of the flow to the flow path.

The secondary flow field effect can include coalesced liquid droplets of the multi-phase flow stream. The primary flow field and secondary flow field effect can collide against one or more impact members to separate additional liquid from the multi-phase flow stream. Finally, the separated gas can be directed to the gas outlet by standard techniques for managing gas flow in gas-liquid separators. In one embodiment, an impact member as described herein may be used to effect efficient separation of the liquid and gas, and direct the gas to the gas outlet.

The disclosures of all cited references including publications, patents, and patent applications are expressly incorporated herein by reference in their entirety.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the present technology be limited to the specific values recited when defining a range.

The present technology is further defined in the following Example. It should be understood that this Example is given by way of illustration only.

EXAMPLES

Example 1—Food Coloring and Carbon Dioxide

An exemplary curvilinear flow path was prepared using transparent 0.250 inch id tubing. The curvilinear flow path included 3 loops and was similar to the embodiment 650 shown in FIG. 6. Fluids, including a multi-phase fluid, were flowed through the tubing to observe the flow pattern. The flow patterns were observed with the aid of liquid food coloring. In particular, a mixture of food coloring and carbon dioxide was flowed through the curvilinear flow path. It was observed that the food coloring, which is a liquid, collected or pooled on the inner bend radius.

While this technology has been particularly shown and described with reference to example embodiments thereof, it will be understood by those skilled in the art that various changes in form and details may be made therein without departing from the scope of the technology encompassed by the appended claims.

What is claimed is:

1. A gas-liquid separator for a multi-phase flow stream, comprising:
    an enclosed tubing having an inlet adapted to receive a multi-phase flow stream and an outlet connected to a vessel, the enclosed tubing configured in a curvilinear flow path from the inlet to the outlet to create laminar flow conditions within the multi-phase flow stream wherein the vessel includes a solvent outlet and a gas outlet; and
    an actuator adapted to produce a change in length of the enclosed tubing along a first direction or outer diameter (D);
    wherein the curvilinear flow path has a curvature ratio (d/D) adapted to produce the laminar flow conditions within the multi-phase flow stream.

2. The gas-liquid separator of claim 1, wherein the curvilinear flow path extends substantially in a 2-D plane.

3. The gas-liquid separator of claim 1, wherein the curvilinear flow path extends substantially in three dimensions.

4. The gas-liquid separator of claim 1, wherein the multi-phase flow stream includes $CO_2$.

5. The gas-liquid separator of claim 1, wherein the outlet is connected to the vessel at substantially a right angle.

6. A gas-liquid separator for a multi-phase flow stream, comprising:
    a vessel extending in a first direction having a liquid outlet for discharging a liquid after separation of the liquid from the multi-phase flow stream and a gas outlet for discharging a gas after separation of the gas from the multi-phase flow stream;
    an inlet for receiving a multi-phase flow stream, wherein the inlet is fluidly connected to the vessel through a tubing having a lumen about a central axis, the tubing comprising a curvilinear flow path that extends a distance over the first direction, wherein the curvilinear flow path has a curvature ratio (d/D) adapted to produce laminar flow conditions within the multi-phase flow stream; and
    an actuator adapted to produce a change in length of the tubing along the first direction or outer diameter (D).

7. The gas-liquid separator of claim 6, wherein the curvilinear flow path has a pitch that remains constant over the first direction.

8. The gas-liquid separator of claim 6, wherein the curvilinear flow path has an inner diameter that remains constant over the first direction.

9. The gas-liquid separator of claim 6, wherein a pitch of the curvilinear flow path varies along the first direction.

10. The gas-liquid separator of claim 6, wherein the outer diameter of the curvilinear flow path varies along the first direction.

11. The gas-liquid separator of claim 10, wherein the outer diameter increases along the first direction.

12. The gas-liquid separator of claim 6, wherein the curvilinear flow path has a curvature ratio (d/D) adapted to minimize turbulent flow.

13. The gas-liquid separator of claim 6, wherein the curvilinear flow path is adapted to produce a shift in the flow velocity of an axial flow field as a result of a secondary flow field effect acting perpendicular to a primary flow field.

14. The gas-liquid separator of claim 13, wherein the secondary flow field effect in combination with a centrifugal force drives a liquid within the multi-phase flow stream to an inner bend radius of the tubing.

15. The gas-liquid separator of claim 6, wherein the tubing is formed from an expandable material.

16. A phase separation system, comprising:
   (i) a mixing unit for mixing together at least two different fluid sources;
   (ii) a gas-liquid separator, located downstream and in fluid communication with the mixing unit, the gas-liquid separator including a vessel extending in a first direction having a liquid outlet for discharging a liquid after separation of the liquid from a multi-phase flow stream and a gas outlet for discharging a gas after separation of the gas from the multi-phase flow stream;
   (iii) an inlet for receiving a multi-phase flow stream, wherein the inlet is fluidly connected to the vessel through a tubing having a lumen about a central axis, the tubing comprising a curvilinear flow path that extends a distance over the first direction; and
   (iv) an actuator adapted to produce a change in length of the tubing along the first direction or outer diameter (D).

17. The phase separation system of claim 16, wherein the mixing unit comprises a pressure drop, wherein the multi-phase flow stream is generated.

18. The phase separation system of claim 16, wherein the curvilinear flow path is adapted to produce a shift in the flow velocity of an axial flow field as a result of a secondary flow field effect acting perpendicular to a primary flow field.

19. The phase separation system of claim 18, wherein the secondary flow field effect in combination with a centrifugal force drives a liquid within the multi-phase flow stream to an inner bend radius of the tubing.

20. The phase separation system of claim 16, further comprising a chromatography column positioned downstream of the mixing unit but upstream of the gas-liquid separator.

21. A method for separating a multi-phase flow stream into a gas and a liquid within a gas-liquid separator, comprising:
   (i) providing a gas-liquid separator that includes an inlet and a vessel extending in a first direction having a liquid outlet and a gas outlet;
   (ii) introducing the multi-phase flow stream as a primary flow field into the inlet;
   (iii) passing the multi-phase flow stream through a tubing comprising a curvilinear flow path to generate a secondary flow field effect acting perpendicular to the primary flow field for separation of the gas from the flow stream;
   (iv) driving a liquid within the multi-phase flow stream to an inner bend radius of the curvilinear flow path;
   (v) producing a change in length of the curvilinear flow path along the first direction or outer diameter (D) using an actuator;
   (vi) directing the separated gas to the gas outlet; and
   (vii) collecting the liquid by gravity through the liquid outlet.

* * * * *